(12) United States Patent
Matsumoto et al.

(10) Patent No.: US 11,901,509 B2
(45) Date of Patent: Feb. 13, 2024

(54) ELECTROLYTE SOLUTION AND ELECTROCHEMICAL DEVICE

(71) Applicant: MURATA MANUFACTURING CO., LTD., Kyoto (JP)

(72) Inventors: Ryuhei Matsumoto, Kyoto (JP); Daisuke Mori, Kyoto (JP); Yuri Nakayama, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 253 days.

(21) Appl. No.: 16/545,795

(22) Filed: Aug. 20, 2019

(65) Prior Publication Data

US 2020/0075999 A1 Mar. 5, 2020

Related U.S. Application Data

(63) Continuation of application No. PCT/JP2017/035512, filed on Sep. 29, 2017.

(30) Foreign Application Priority Data

Feb. 21, 2017 (JP) .................................. 2017-029933

(51) Int. Cl.
*H01M 10/0569* (2010.01)
*H01M 10/0568* (2010.01)
*H01M 4/46* (2006.01)
*H01M 10/054* (2010.01)

(52) U.S. Cl.
CPC ....... *H01M 10/0568* (2013.01); *H01M 4/466* (2013.01); *H01M 10/054* (2013.01); *H01M 10/0569* (2013.01); *H01M 2300/0028* (2013.01)

(58) Field of Classification Search
CPC .......... H01M 10/054; H01M 10/0568; H01M 10/0569; H01M 4/466; H01M 2300/0028
See application file for complete search history.

(56) References Cited

U.S. PATENT DOCUMENTS

| | | | |
|---|---|---|---|
| 2013/0252112 A1* | 9/2013 | Doe .................. | H01M 10/0568 429/328 |
| 2015/0072248 A1* | 3/2015 | Watanabe ............... | H01M 4/38 429/188 |
| 2018/0375156 A1* | 12/2018 | Zhamu .................... | C07C 21/04 |

FOREIGN PATENT DOCUMENTS

| | | |
|---|---|---|
| CN | 1411086 | 4/2003 |
| CN | 106025331 | 10/2016 |
| JP | H11297354 | 10/1999 |
| JP | H11297354 A | 10/1999 |
| JP | 2008135273 A | 6/2008 |
| JP | 2017168371 A | 9/2017 |
| WO | 2017/006629 | 1/2017 |

OTHER PUBLICATIONS

Japanese Office Action dated Aug. 11, 2020, in corresponding Japanese Application No. 2019-501023.

(Continued)

*Primary Examiner* — Osei K Amponsah
(74) *Attorney, Agent, or Firm* — K&L Gates LLP

(57) ABSTRACT

An electrochemical device including a negative electrode made of a magnesium-based material includes an electrolyte solution consisting of a solvent composed of linear ether, and magnesium salt dissolved in the solvent, in which the magnesium salt is dissolved in 3 moles or more per liter of the solvent.

3 Claims, 11 Drawing Sheets

(56) References Cited

OTHER PUBLICATIONS

International Search Report for Application No. PCT/JP2017/035512, dated Dec. 5, 2017.
Chinese Office Action dated Dec. 9, 2021 in corresponding Chinese Application No. 201780086861.8.
Chinese Office Action dated Jul. 15, 2022 in corresponding Chinese Application No. 201780086861.8.
Chinese Office Action dated Feb. 15, 2023 in corresponding Chinese Application No. 201780086861.
Chinese Office Action dated Oct. 31, 2022 in corresponding Chinese Application No. 201780086861.
Chinese Office Action dated Nov. 15, 2023 in corresponding Chinese Application No. 201780086861.

* cited by examiner

US 11,901,509 B2

ELECTROLYTE SOLUTION AND ELECTROCHEMICAL DEVICE

CROSS-REFERENCE TO RELATED APPLICATIONS

The present application is a continuation of PCT patent application no. PCT/JP2017/035512, filed on Sep. 29, 2017, which claims priority to Japanese Application No. 2017-029933, filed on Feb. 21, 2017, the entire contents of which are incorporated herein by reference.

TECHNICAL FIELD

The present disclosure relates to an electrolyte solution and an electrochemical device.

BACKGROUND ART

Magnesium, which is used in magnesium batteries, is richer in resources and much cheaper than lithium, is large in the amount of electricity per unit volume that can be taken out by oxidation-reduction reaction, and is also highly safe when used in batteries.

Therefore, magnesium batteries are attracting attention as next-generation secondary batteries to replace lithium ion batteries. However, magnesium batteries have the problem of poor cycle characteristics. It is considered that the deterioration of the cycle characteristics is caused when sulfur or a sulfur reductant produced as the battery discharges is diffused to the interface of a magnesium-based material constituting a negative electrode and causes a corrosion reaction to consume the sulfur, and the sulfur which is an active material in a positive electrode degreases.

A magnesium battery using $MgCl_2$ and $Mg(TFSI)_2$ as magnesium salt constituting an electrolyte solution and using dimethoxyethane (DME) as a solvent for improving cycle characteristics is well known from US Patent Publication No. 2013/252112 A1.

PRIOR ART DOCUMENT

Patent Document

Patent Document 1: US Patent Publication No. 2013/252112 A1

SUMMARY OF THE INVENTION

Problem to be Solved by the Invention

Incidentally, in the technology disclosed in this US Patent Publication, the molar concentration of Mg is 0.1M to 2M. However, it is found as a result of the present inventors' investigation that the improvement of the cycle characteristics is insufficient when the molar concentration of Mg is 0.1M to 2M.

Therefore, an object of the present disclosure is to provide an electrochemical device capable of further improving the cycle characteristics, and an electrolyte solution suitable for use in such an electrochemical device.

Means for Solving the Problem

In order to attain the above-mentioned object, according to the present disclosure, there is provided an electrolyte solution for an electrochemical device including a negative electrode made of a magnesium-based material, in which the electrolyte solution consists of a solvent composed of linear ether, and magnesium salt dissolved in the solvent, and in which the magnesium salt is dissolved in 3 moles or more per liter of the solvent.

In order to attain the above-mentioned object, there is provided an electrochemical device including a negative electrode made of a magnesium-based material, in which the electrochemical device includes an electrolyte solution consisting of a solvent composed of linear ether, and magnesium salt dissolved in the solvent, and in which the magnesium salt is dissolved in 3 moles or more per liter of the solvent.

Advantageous Effect of the Invention

In the electrolyte solution of the present disclosure or the electrochemical device of the present disclosure, the magnesium salt constituting the electrolyte solution is dissolved in 3 moles or more per liter of the solvent, that is, by using an ultra-high concentration electrolyte solution which is not known conventionally, the cycle characteristics can be dramatically improved. The effects described in the present specification are merely examples and are not limited, and may have additional effects.

MODE FOR CARRYING OUT THE INVENTION

Figure 1:
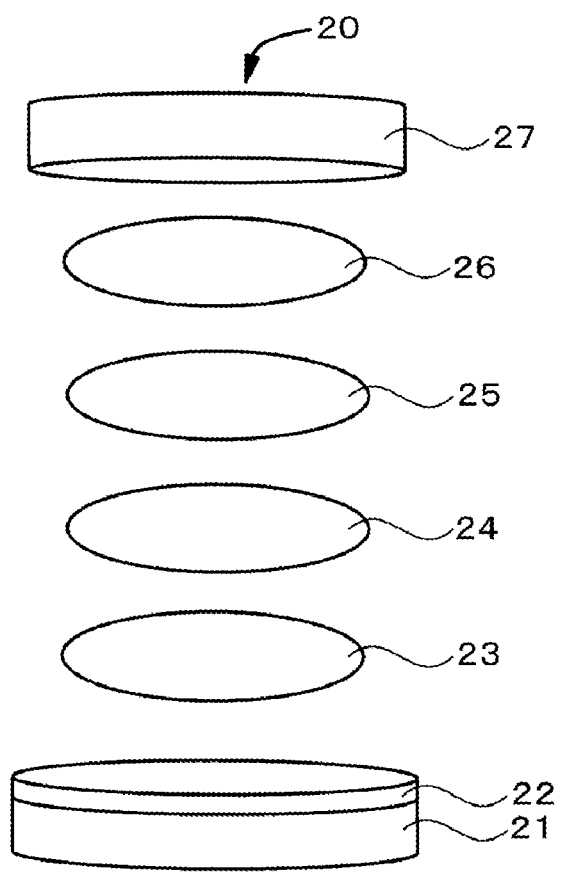
FIG. 1 is a schematic exploded view of an electrochemical device (battery) of Example 1.

Hereinafter, the present disclosure will be described based on Examples with reference to the drawings, but the present disclosure is not limited to Examples, and various numerical values and materials in Examples are examples. The description will be made in the following order.

1. General description of electrolyte solution of present disclosure and electrochemical device of present disclosure
2. Example 1 (electrolyte solution of present disclosure and electrochemical device of present disclosure)
3. Example 2 (modification of Example 1)
4. Example 3 (application example of magnesium-sulfur secondary battery of Example 1)
5. Other <General Description of Electrolyte Solution of Present Disclosure and Electrochemical Device of Present Disclosure>

An electrolyte solution of the present disclosure is an electrolyte solution for an electrochemical device further including a positive electrode made of sulfur, and may be in a mode in which the solubility of sulfur is 0.5 milligram or less per milliliter of the electrolyte solution. In addition, an electrochemical device of the present disclosure may further include a positive electrode made of sulfur, and may be in a mode in which the solubility of sulfur is 0.5 milligram or less per milliliter of the electrolyte solution. Here, the solubility of sulfur in the electrolyte solution can be determined by the following method. That is, an excessive amount of powdered sulfur is charged into the electrolyte solution. Then, after stirred for 1 day at room temperature, the electrolyte solution is filtered with a filter with a pore size of 0.45 μm to remove undissolved sulfur particles. Next, sulfur dissolved in the electrolyte solution is quantified by high performance liquid chromatography. The solubility of sulfur is preferably lowered to the extent possible, and the lower limit of the solubility of sulfur can not be specified.

In the electrolyte solution of the present disclosure or the electrochemical device of the present disclosure including the above preferred mode, magnesium salt may be in a mode of $MgCl_2$ and $Mg(TFSI)_2$, but is not limited thereto. Alternatively, the magnesium salt may be composed of $MgX_n$ (provided that, n is 1 or 2 and X is a monovalent or divalent anion), where X is a molecule containing halogen, —$SO_4$ or —$NO_3$ or a hexaalkyl disiazide group. Specifically, the molecule containing halogen (halide) can be composed of $MgX_2$ (X=F, Cl, Br, I), and more specifically, there can be given, magnesium fluoride ($MgF_2$), magnesium chloride ($MgCl_2$), magnesium bromide ($MgBr_2$), and magnesium iodide ($MgI_2$).

Alternatively, the magnesium salt can be magnesium salt of at least one selected from the group consisting of magnesium perchlorate ($Mg(ClO_4)_2$), magnesium nitrate ($Mg(NO_3)_2$), magnesium sulfate ($MgSO_4$), magnesium acetate ($Mg(CH_3COO)_2$), magnesium trifluoroacetate ($Mg(CF_3COO)_2$), magnesium tetrafluoroborate ($Mg(BF_4)_2$), magnesium tetraphenylborate ($Mg(B(C_6H_5)_4)_2$, magnesium hexafluorophosphate ($Mg(PF_6)_2$), magnesium hexafluoroarsenate ($Mg(AsF_6)_2$), magnesium perfluoroalkyl sulfonate (($Mg(R_{f1}SO_3)_2$), provided that $R_{f1}$ is a perfluoroalkyl group), magnesium perfluoroalkylsulfonylimidate ($Mg((R_{f2}SO_2)_2N)_2$, provided that $R_{f2}$ is a perfluoroalkyl group), and magnesium hexaalkyl disiazide (($Mg(HRDS)_2$), provided that R is an alkyl group).

Furthermore, in the electrolyte solution of the present disclosure or the electrochemical device of the present disclosure including the preferred mode described above, a solvent is preferably composed of linear ether. As specific examples of the linear ether, there can be given ethylene glycol dimethyl ether (dimethoxyethane), diethylene glycol dimethyl ether, triethylene glycol dimethyl ether, tetraethylene glycol dimethyl ether, pentaethylene glycol dimethyl ether, hexaethylene glycol dimethyl ether, polyethylene glycol dimethyl ether, and triethylene glycol butyl methyl ether, and among these, ethylene glycol dimethyl ether (dimethoxyethane, DME) is preferably used.

The electrochemical device of the present disclosure including the various preferred modes described above can be in a mode of a battery (specifically, a primary battery or a secondary battery) in which an electrolyte layer is constituted by an electrolyte solution.

When the electrochemical device of the present disclosure is a battery (specifically, a primary battery or a secondary battery) in which an electrolyte layer is constituted by the electrolyte solution of the present disclosure, as the battery, there can be given a negative electrode made of a magnesium-based material, specifically, there is given a battery including a negative electrode (specifically, a negative electrode active material) composed of magnesium, a magnesium alloy, or a magnesium compound, and as a more specific secondary battery, there can be given a magnesium battery, an air battery, and a fuel cell. Alternatively, as the electrochemical device of the present disclosure, a capacitor, a sensor, a magnesium ion filter, and the like can be given. The capacitor includes a positive electrode, a negative electrode, and a separator sandwiched between the positive electrode and the negative electrode and impregnated with an electrolyte solution.

In addition, when the electrochemical device of the present disclosure is a battery in which an electrolyte layer is constituted by the electrolyte solution of the present disclosure, there can be used a positive electrode using, as a positive electrode active material, for example, oxides, halides, sulfides, or selenides of, in addition to sulfur (S) such as $S_8$ or polymeric sulfur, fluorinated graphite $((CF)_n)$, and various metals [for example, scandium (Sc), titanium (Ti), vanadium (V), chromium (Cr), silicon (Si), manganese (Mn), iron (Fe), cobalt (Co), nickel (Ni) copper (Cu), zinc (Zn), molybdenum (Mo), and the like], but the present disclosure is not limited thereto. The positive electrode can have, for example, a structure in which a positive electrode active material layer is formed on the surface of a positive electrode current collector. However, the positive electrode may have a structure including only the positive electrode active material layer without including the positive electrode current collector. The positive electrode current collector is made of, for example, a metal foil such as an aluminum foil. The positive electrode active material layer may contain at least one of a conductive additive and a binder as necessary.

As the conductive additive, there can be given, for example, carbon materials such as graphite, carbon fiber, carbon black, carbon nanotubes, and one or two or more of these can be mixed and used. As the carbon fiber, for example, vapor growth carbon fiber (VGCF) can be used. As the carbon black, for example, acetylene black or ketjen black can be used. As the carbon nanotubes, for example, multi-wall carbon nanotubes (MWCNT) such as a single wall carbon nanotubes (SWCNT) and a double wall carbon nanotubes (DWCNT) can be used. As long as the material has good conductivity, materials other than the carbon materials can be used, and for example, a metal material such as Ni powder and a conductive polymer material can be used. As the binder, for example, polymer resins such as fluorine resins such as polyvinylidene fluoride (PVdF) and polytetrafluoroethylene (PTFE), polyvinyl alcohol (PVA) resin, and styrene-butadiene copolymer rubber (SBR) resin can be used. In addition, a conductive polymer may be used as the binder. As the conductive polymer, for example, substituted or unsubstituted polyaniline, polypyrrole, or polythiophene, or a (co)polymer composed of one or two or more selected from these can be used.

As a material constituting a negative electrode (specifically, a negative electrode active material), there can be given, as mentioned above, a magnesium metal single substance, a magnesium alloy, and a magnesium compound. The negative electrode is made of, for example, a plate-like material or a foil-like material, but is not limited thereto, and can be formed (shaped) using powder.

Alternatively, a structure in which a negative electrode active material layer is formed in the vicinity of the surface of the negative electrode can be employed. As the negative electrode active material layer, there can be given a layer having magnesium ion conductivity which contains magnesium (Mg) and further contains at least one of carbon (C), oxygen (O), sulfur (S), and halogen. Such a negative electrode active material layer preferably has a single peak derived from magnesium in the range of 40 eV or more and 60 eV or less. As the halogen, there can be given, for example, at least one selected from the group consisting of fluorine (F), chlorine (Cl), bromine (Br), and iodine (I). And in this case, the negative electrode active material layer more preferably has a single peak derived from magnesium in the range of 40 eV or more and 60 eV or less over the depth of $2 \times 10^{-7}$ m from the surface of the negative electrode active material layer. This is because the negative electrode active material layer exhibits good electrochemical activity from the surface to the inside. Further, for the same reason, it is preferable that the oxidation state of magnesium is substantially constant from the surface of the negative electrode active material layer in the depth direction to $2 \times 10^{-7}$ nm. Here, the surface of the negative electrode active material layer means the surface on the side constituting the surface of the electrode among the both surfaces of the negative electrode active material layer, and the back surface means the surface on the opposite side to the surface, that is, the surface on the side which forms the interface of a collector and the negative electrode active material layer. Whether or not the negative electrode active material layer contains the above-described elements can be confirmed based on XPS (X-ray Photoelectron Spectroscopy). In addition, it can be similarly confirmed based on the XPS method that the negative electrode active material layer has the above peak and that the magnesium has an oxidized state.

The positive electrode and the negative electrode are separated by an inorganic separator or an organic separator which allows magnesium ion to pass while preventing a short circuit due to the contact of the both electrodes. As the inorganic separator, there can be given, for example, a glass filter and glass fiber. As the organic separator, there can be given, for example, a porous membrane made of synthetic resin made of polytetrafluoroethylene, polypropylene, polyethylene, and the like, and a structure in which two or more of these are laminated can also be employed. Among them, a porous membrane made of polyolefin is preferable because it is excellent in the short circuit preventing effect and can improve the safety of the battery by the shutdown effect.

The electrolyte layer can be composed of the electrolyte solution of the present disclosure and a polymer compound composed of a holder that holds the electrolyte solution. The polymer compound may be swollen by an electrolyte solution. In this case, the polymer compound swollen by the electrolyte solution may be in the form of gel. As the polymer compound, there can be given, for example, polyacrylonitrile, polyvinylidene fluoride, a copolymer of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, styrene-butadiene rubber, nitrile-butadiene rubber, polystyrene, and polycarbonate. In particular, polyacrylonitrile, polyvinylidene fluoride, polyhexafluoropropylene, or polyethylene oxide is preferable from the viewpoint of electrochemical stability. The electrolyte layer can also be a solid electrolyte layer.

Figure 7:
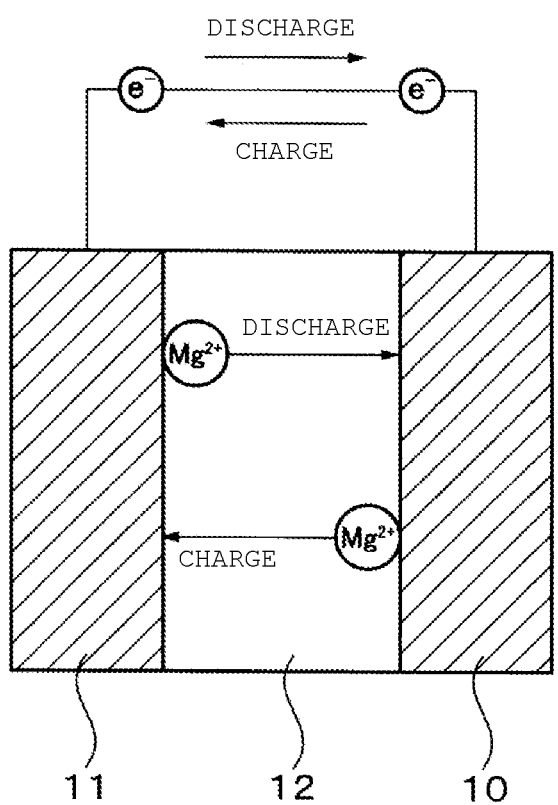
FIG. 7 is a conceptual view of an electrochemical device (battery) of the present disclosure.

As shown in FIG. 7 of the conceptual view of the electrochemical device (battery), in the magnesium secondary battery having the configuration described above, during charging, the magnesium ion ($Mg^{2+}$) passes from a positive electrode 10 through an electrolyte layer 12 to move to a negative electrode 11, so that electrical energy is converted to chemical energy and stored. During discharging, the magnesium ion returns from the negative electrode 11 to the positive electrode 10 through the electrolyte layer 12 to generate electrical energy.

When the electrochemical device of the present disclosure is a battery (a primary battery or a secondary battery) in which an electrolyte layer is constituted by the electrolyte solution of the present disclosure, such a battery can be used, for example, as a driving power source or an auxiliary power source of a notebook personal computer, a PDA (portable information terminal), a mobile phone, a smart phone, a master phone and an extension of a cordless phone, a video movie, a digital still camera, an electronic book, an electronic dictionary, a portable music player, a radio, a headphone, a game console, a navigation system, a memory card, a cardiac pacemaker, a hearing aid, an electric tool, an electric shaver, a refrigerator, an air conditioner, a television receiver, a stereo, a water heater, a microwave oven, a dishwasher, a washing machine, a dryer, a lighting device, a toy, a medical device, a robot, a road conditioner, a traffic light, a railway vehicle, a golf cart, an electric cart, an electric car (hybrid car), or the like. Further, it can be mounted on a power source for storing power for a building or a power generation facility such as a house, or can be used to supply power thereto. In an electric car, a conversion device that converts power into driving force by supplying power is generally a motor. The control device (control unit) that performs information processing related to vehicle control includes a control device or the like that performs battery remaining amount display based on information related to the remaining amount of the battery. Further, batteries can also be used in power storage devices in so-called smart grids. Such a power storage device can not only supply power but also store power by receiving power supply from other power sources. As other power sources, for example, thermal power generation, nuclear power generation, hydroelectric power generation, solar cells, wind power generation, geothermal power generation, fuel cells (including biofuel cells), and the like can be used.

The electrochemical device (or secondary battery) of the present disclosure including the above-described various preferable modes and configurations can be applied to a secondary battery in a battery pack including a secondary battery, control means (control unit) that performs control related to the secondary battery, and an outer package accommodating the secondary battery. In this battery pack, the control means controls, for example, charge and discharge, overdischarge, or overcharge related to the secondary battery.

The electrochemical device (or secondary battery) of the present disclosure including the above-described various preferable modes and configurations can be applied to a secondary battery in an electronic device that receives power supply from the secondary battery.

The electrochemical device (or secondary battery) of the present disclosure including the above-described various preferable modes and configurations can be applied to a secondary battery in an electric vehicle including a conversion device that receives power supply from a secondary battery and converts it into driving force of a vehicle, and a control device (control unit) that performs information processing related to vehicle control based on information related to the secondary battery. In the electric vehicle, the conversion device typically receives power supply from the secondary battery to drive the motor and generate driving force. Regenerative energy can also be used to drive the motor. In addition, the control device (control unit) performs, for example, information processing related to vehicle control based on the battery remaining amount of the secondary battery. The electric vehicle includes, for example, so-called hybrid cars as well as electric cars, electric motorcycles, electric bicycles, railway vehicles, and the like.

The electrochemical device (or secondary battery) of the present disclosure including the above-described various preferable modes and configurations can be applied to a secondary battery in a power system configured to receive power supply from the secondary battery and/or supply power from the power source to the secondary battery. This power system may be any power system as long as it uses approximately power, and also includes a mere power device. The power system includes, for example, a smart grid, a home energy management system (HEMS), a vehicle, and the like, and can also store power.

The electrochemical device (or secondary battery) of the present disclosure including the above-described various preferable modes and configurations can be applied to a secondary battery in a power source for storing power including a secondary battery and configured to be connected to an electronic device to which power is supplied. The power source for storing power can be basically used in any power system or power device regardless of the application of the power source, but it can be used, for example, in a smart grid.

Example 1

Example 1 relates to electrolyte solution of present disclosure and electrochemical device of present disclosure The electrolyte solution of Example 1 is an electrolyte solution for an electrochemical device including a negative electrode made of a magnesium-based material. Further, the electrolytic solution consists of a solvent composed of linear ether, and magnesium salt dissolved in the solvent, and the magnesium salt is dissolved in 3 moles or more per liter of the solvent.

In addition, the electrochemical device of Example 1 is an electrochemical device including a negative electrode made of a magnesium-based material, and includes an electrolyte solution consisting of a solvent composed of linear ether, and magnesium salt dissolved in the solvent, and the magnesium salt is dissolved in 3 moles or more per liter of the solvent.

That is, the electrochemical device of Example 1 is specifically a battery in which an electrolyte layer is constituted by the electrolyte solution of Example 1 (more specifically, a secondary battery, in which the negative electrode (specifically, a negative electrode active material) is made of a magnesium-based material).

Furthermore, the electrochemical device of Example 1 includes a positive electrode made of a material containing sulfur (S). That is, the electrochemical device of Example 1 is specifically a magnesium-sulfur secondary battery.

Further, in the electrolyte solution or the electrochemical device of Example 1, the magnesium salt is specifically a mixed system of $MgCl_2$ and $Mg(TFSI)_2$ [magnesium bistrifluoromethanesulfonyl imide]. Moreover, the solvent is composed of linear ether, specifically, ethylene glycol dimethyl ether (dimethoxyethane, DME).

The electrolyte solution and the magnesium-sulfur secondary battery of Example 1 were composed of the materials shown in Table 1 below.

TABLE 1

Positive electrode: 10% by mass of sulfur (S) manufactured by Wako Pure Chemical Industries, Ltd.
Negative electrode: Magnesium plate manufactured by RIKAZAI CO., LTD.
(Purity 99.9%, thickness 0.2 mm)
Conductive additive: Ketjen black (KB) ECP600JD manufactured by Lion Corporation
Binder: Polytetrafluoroethylene manufactured by AGC Inc.
Separator: Glass fiber GC50 manufactured by Advantec Toyo Kaisha, Ltd.
$MgCl_2$ Anhydride: Manufactured by Sigma-Aldrich Japan
$Mg(TFSI)_2$: Manufactured by Tomiyama Pure Chemical Industries, Ltd. (dehydration specification for batteries)
Dimethoxyethane: Manufactured by Tomiyama Pure Chemical Industries, Ltd. (dehydration specification for batteries)

As the electrolyte solution, $MgCl_2$ and $Mg(TFSI)_2$ of predetermined concentrations shown in Table 2 below were dissolved in DME as a solvent.

TABLE 2

| $MgCl_2$ (mole) | $Mg(TFSI)_2$ (mole) | Total concentration of Mg salt |
|---|---|---|
| 0.5 | 0.25 | 0.75 |
| 1.0 | 0.50 | 1.5 |
| 1.4 | 0.7 | 2.1 |
| 1.6 | 0.8 | 2.4 |
| 1.8 | 0.9 | 2.7 |
| 2.0 | 1.0 | 3.0 |
| 2.2 | 1.1 | 3.3 |

The ratio of $MgCl_2$ (mole)/Mg $(TFSI)_2$ (mole) is not limited to 2.0,
and it is preferable to satisfy $1.5 \leq [MgCl_2 \text{ (mole)}]/[Mg(TFSI)_2 \text{ (mole)}] \leq 2.5$.

Then, a magnesium-sulfur secondary battery (coin battery CR2016 type) containing sulfur (S) in the positive electrode (that is, including a positive electrode using sulfur as the positive electrode active material), and magnesium in the negative electrode was manufactured. Specifically, a coin battery was manufactured using magnesium (Mg) as the negative electrode and sulfur (S) as the positive electrode. Then, the relationship between the total concentration of Mg salt in the electrolyte solution and the cycle characteristics was examined. The test conditions are shown in Table 3 below.

TABLE 3

Discharge condition: Constant current discharge 0.1 mA/cutoff voltage 0.4 V
Charge condition: CC-CV charge 0.1 mA/2.2 V-1600 mAh/g cut off
Temperature: 25° C.

A positive electrode 23 was mixed with 10% by mass of sulfur ($S_8$), 60% by mass of ketjen black as a conductive additive, and 30% by mass of polytetrafluoroethylene (PTFE) as a binder using an agate mortar. Then, it was rolled and formed about 10 times using a roller compactor while conforming to acetone. Thereafter, it was dried by vacuum drying at 70° C. for 12 hours. Thus, the positive electrode 23 was obtained.

A state in which a coin battery 20 is disassembled is shown in a schematic view of FIG. 1. A gasket 22 is placed on a coin battery can 21, and the positive electrode 23 made of sulfur, a separator 24 made of glass fiber, a negative electrode 25 made of Mg plate of 1.5 mm in diameter and 0.2 mm in thickness, a spacer 26 made of a stainless steel plate of 0.5 mm in thickness, and a coin battery cover 27 were laminated in this order, and then the coin battery can 21 was crimped and sealed. The spacer 26 was spot-welded to the coin battery cover 27 in advance. In each test coin battery 20, the separator 24 contained an electrolyte solution having the composition shown in Table 2.

Figure 2A:
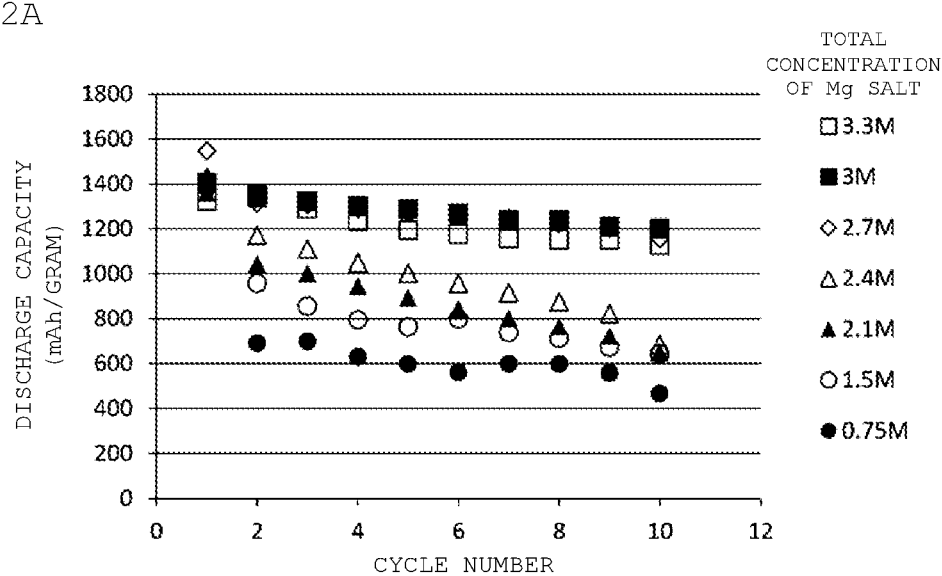
FIG. 2A is a graph plotting the relationship between the charge/discharge cycle number and the discharge capacity (unit: mAh/gram) in a magnesium-sulfur secondary battery in Example 1 using an electrolyte solution having a composition shown in Table 2.
Figure 2B:
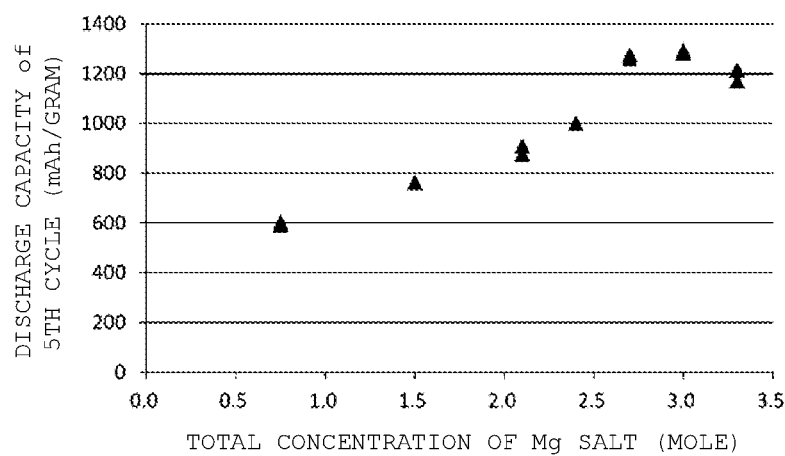
FIG. 2B is a graph plotting the relationship between the discharge capacity (unit: mAh/gram) of the 5th charge/discharge cycle and the total concentration of Mg salt in the magnesium-sulfur secondary battery in Example 1 using the electrolyte solution having the composition shown in Table 2.
Figure 2C:
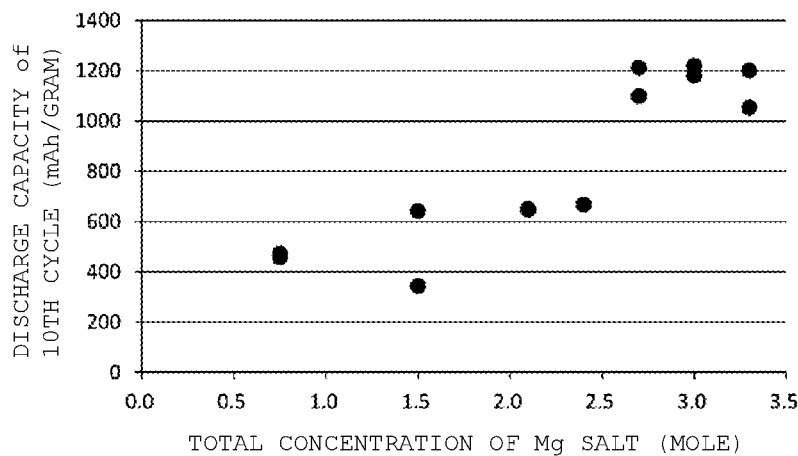
FIG. 2C is a graph plotting the relationship between the discharge capacity (unit: mAh/gram) of the 10th charge/discharge cycle and the total concentration of Mg salt in the magnesium-sulfur secondary battery in Example 1 using the electrolyte solution having the composition shown in Table 2.

FIG. 2A is a graph plotting the relationship between the charge/discharge cycle number and the discharge capacity (unit: mAh/gram) in the magnesium-sulfur secondary battery using the electrolyte solution having the composition shown in Table 2. Moreover, FIG. 2B and FIG. 2C are graphs plotting the relationship between the discharge capacity (unit: mAh/gram) of the 5th charge/discharge cycle and the 10th charge/discharge cycle and a total concentration of Mg salt.

It can be seen from FIG. 2A that, with the increase in the total concentration of Mg salt, high discharge capacity is exhibited even at the 10th charge/discharge cycle. In FIG. 2A, data pieces of the total concentration of Mg salt of 3.3 mol, 3.0 mol, and 2.7 mol overlap in most cycle numbers. Moreover, it can be seen from FIG. 2B and FIG. 2C that high discharge capacity is maintained with the increase in the total concentration of Mg salt. The discharge capacity at the 10th cycle was about 200 mAh/gram in the conventional report example, whereas the discharge capacity at the 10th cycle was able to maintain 1200 mAh/gram in Example 1. That is, from the results of the above FIGS. 2A, 2B, and 2C, it is found that the magnesium salt is dissolved in 3 moles or more (2.5 moles or more in terms of 2 significant digits) per liter of the solvent, so that excellent cycle characteristics can be achieved.

Figure 3:
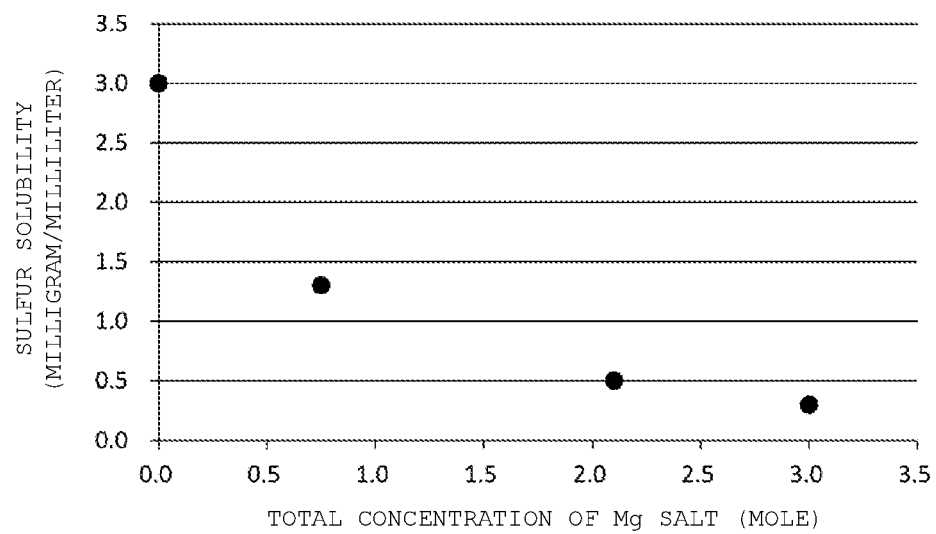
FIG. 3 is a graph showing the solubility of sulfur relative to the total concentration of Mg salt.

Further, the solubility of sulfur relative to the total concentration of Mg salt is shown in FIG. 3. The horizontal axis of FIG. 3 represents the number of moles of the total concentration of Mg salt dissolved in 1 liter of DME. As the concentration of magnesium increases, the solubility of sulfur decreases. From the results shown in FIG. 2A, FIG. 2B, FIG. 2C, and FIG. 3, it is assumed that the decrease in the solubility of sulfur in the solvent in which the Mg salt is dissolved, that is, the suppression of the outflow of sulfur from the positive electrode greatly affects the improvement of the cycle characteristics.

As described above, in Example 1, it is found that the cycle characteristics of the electrochemical device (specifically, the magnesium-sulfur secondary battery) are dramatically improved by using the ether electrolyte solution having a very high total concentration of Mg salt. Ii is assumed that, because the total concentration of Mg salt is very high, most of the solvent in the electrolyte solution is in a state of being coordinated to the Mg salt and does not coordinate sulfur, and sulfur is prevented from being eluted from the positive electrode and stays in the positive electrode, so that the cycle characteristics are stable.

In addition, because the highly stable Mg salt of $MgCl_2$/$Mg(TFSI)_2$ is used, high safety can be obtained even at a very high concentration, which differs greatly from an electrolyte solution using conventional $AlCl_3$ or Grignard. Moreover, since $MgCl_2$ and $Mg(TFSI)_2$ have low reactivity, no side reaction other than electrochemical reaction with sulfur occurs, and higher capacity is expected. Furthermore, since the overvoltage of precipitation and dissolution of magnesium is low, the hysteresis of charge and discharge becomes narrower than that of the conventional reported example, and high energy density can be expected. In addition, since the total concentration of Mg salt is very high, high ion conductivity and high rate characteristics can be expected, the freezing point is lower, and the boiling point is further higher, so that a battery having a wide temperature range can be expected.

Example 2

Figure 4:
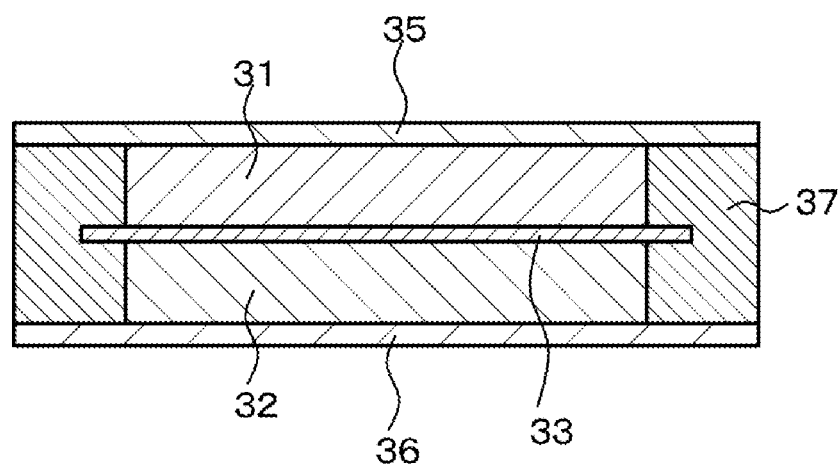
FIG. 4 is a schematic cross-sectional view of an electrochemical device (capacitor) of Example 2.

Example 2 is a modification of Example 1. As shown in FIG. 4 of the schematic cross-sectional view, an electrochemical device of Example 2 is formed of a capacitor, and a positive electrode 31 and a negative electrode 32 are arranged to face each other with a separator 33 impregnated with the electrolyte solution of Example 1 interposed therebetween. A gel electrolyte membrane impregnated with the electrolyte solution of Example 1 may be arranged on at least one surface of the separator 33, the positive electrode 31, and the negative electrode 32. Reference numerals 35 and 36 indicate current collectors, and reference numeral 37 indicates a gasket.

Figure 5:
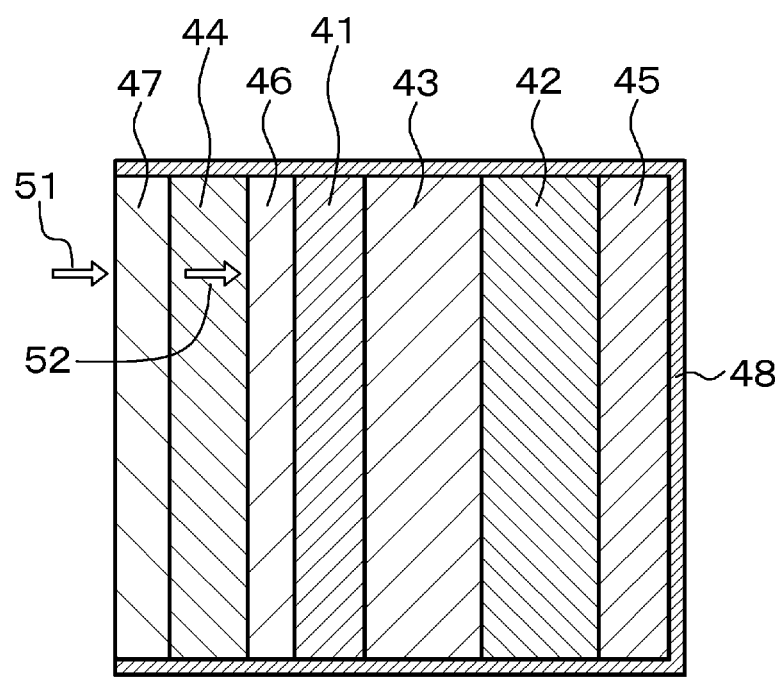
FIG. 5 is a conceptual view of an electrochemical device (air battery) of Example 2.

Alternatively, the electrochemical device of Example 2 is formed of an air battery, as shown in FIG. 5 of the conceptual diagram. The air battery includes, for example, an oxygen-selective permeable film 47 that hardly permeates water vapor and selectively permeates oxygen, an air electrode side current collector 44 made of a conductive porous material, a porous diffusion layer 46 made of a conductive material and arranged between the air electrode side current collector 44 and a porous positive electrode 41, the porous positive electrode 41 containing a conductive material and a catalyst material, a separator and an electrolyte solution 43 that hardly pass water vapor (or an solid electrolyte including electrolyte solution), a negative electrode 42 that releases magnesium ion, a negative electrode side current collector 45, and an exterior body 48 in which these layers are accommodated.

An oxygen 52 in air (atmosphere) 51 is selectively permeated by the oxygen-selective permeable film 47, passes through the air electrode side current collector 44 made of a porous material, is diffused by the diffusion layer 46, and is supplied to the porous positive electrode 41. The progress of oxygen permeated through the oxygen-selective permeable film 47 is partially blocked by the air electrode side current collector 44, but the oxygen having passed through the air electrode side current collector 44 is diffused by the diffusion layer 46 and spread. Thus, the oxygen can be efficiently distributed to the entire porous positive electrode 41, and the supply of oxygen to the entire surface of the porous positive electrode 41 is not inhibited by the air electrode side current collector 44. In addition, since the permeation of water vapor is suppressed by the oxygen-selective permeable film 47, deterioration due to the influence of moisture in the air is small, and oxygen is efficiently supplied to the entire porous positive electrode 41. Thus, the battery output is increased, and the electrochemical device can be used stably for a long time.

Figure 6:
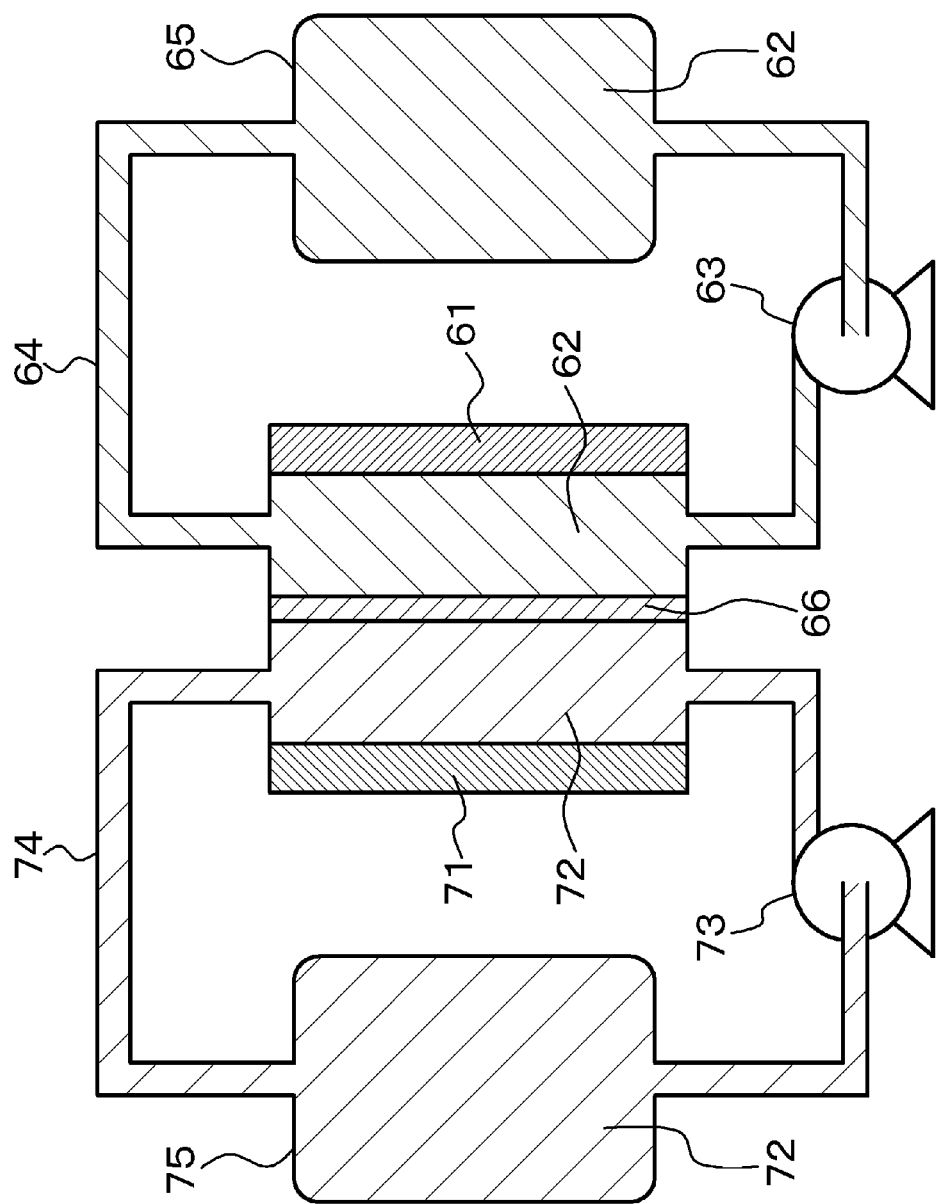
FIG. 6 is a conceptual view of an electrochemical device (fuel cell) of Example 2.

Alternatively, the electrochemical device of Example 2 is formed of a fuel cell, as shown in FIG. 6 of the conceptual diagram. The fuel cell includes, for example, a positive electrode 61, a positive electrode electrolyte solution 62, a positive electrode electrolyte solution transport pump 63, a fuel flow path 64, a positive electrode electrolyte solution storage container 65, a negative electrode 71, a negative electrode electrolyte solution 72, a negative electrode electrolyte solution transport pump 73, a fuel flow path 74, a negative electrode electrolyte solution storage container 75, and an ion exchange membrane 66.

In the fuel flow path 64, the positive electrode electrolyte solution 62 continuously or intermittently flows (circulates) through the positive electrode electrolyte solution storage container 65 and the positive electrode electrolyte solution transport pump 63, and in the fuel flow path 74, the negative electrode electrolyte solution 72 continuously or intermittently flows (circulates) through the negative electrode electrolyte solution storage container 75 and the negative electrode electrolyte solution transport pump 73, so that power is generated between the positive electrode 61 and the negative electrode 71. As the positive electrode electrolyte solution 62, one obtained by adding the positive electrode active material to the electrolyte solution of Example 1 can be used, and as the negative electrode electrolyte solution 72, one obtained by adding the negative electrode active material to the electrolyte solution of Example 1 can be used.

The negative electrode in the electrochemical device can also be produced by the following method.

That is, a Mg electrolyte solution (Mg-EnPS) containing $MgCl_2$ and EnPS (ethyl-n-propylsulfone) in the ratio of $MgCl_2$:EnPS=1:8 (molar ratio) was prepared, and the Mg electrolyte solution was used to precipitate Mg metal on a Cu foil based on the electrolytic plating method, and a Mg plating layer was formed on the Cu foil as a negative electrode active material layer. As a result of analyzing the surface of the Mg plating layer thus obtained based on the XPS method, it became clear that Mg, C, O, S, and Cl existed on the surface of the Mg plating layer, a Mg-derived peak observed by the surface analysis was not split, and a single Mg-derived peak was observed in the range of 40 eV to 60 eV (inclusive). Furthermore, based on the Ar sputtering method, the surface of the Mg plating layer was excavated by about 200 nm in the depth direction, and the surface was analyzed based on the XPS method. As a result, it became clear that the position and the shape of the Mg-derived peak after Ar sputtering were not changed from the position and the shape of the peak before Ar sputtering.

Example 3

In Example 3, the electrochemical device (specifically, a magnesium secondary battery) of the present disclosure and the application example thereof will be described.

The magnesium secondary battery in the present disclosure described in Example 1 can be applied to machines, devices, tools, apparatuses, and systems (collections of a plurality of devices) which can use the secondary battery as a driving power source or a power storage source for storing power without particular limitation. The magnesium secondary battery (specifically, a magnesium-sulfur secondary battery) used as a power source may be a main power source (a power source used preferentially) or an auxiliary power source (a power source used in place of the main power source or by switching from the main Power source). When the magnesium secondary battery is used as an auxiliary power source, the main power source is not limited to the magnesium secondary battery.

Specifically, as applications of the magnesium secondary battery (specifically, a magnesium-sulfur secondary battery) in the present disclosure, there can be exemplified drives of video cameras, camcorders, digital still cameras, mobile phones, personal computers, television receivers, various display devices, cordless phones, headphone stereos, music players, portable radios, electronic paper such as electronic books and electronic newspapers, various electronic devices such as portable information terminals including PDAs, electrical devices (including portable electronic devices), toys, portable household appliances such as electric shavers, lighting equipment such as indoor lights, medical electronic devices such as pacemakers and hearing aids, storage devices such as memory cards, battery packs used as removable power sources for personal computers and the like, electric tools such as electric drills and electric saws, power storage systems and home energy servers such as household battery systems that store power in preparation for emergencies and the like (home storage devices), power supply systems, storage units and backup power sources, electric cars, electric bikes, electric bicycles, electric vehicles such as Segway (registered trademark), and power driving force conversion devices such as aircrafts and ships (specifically, for example, power motors), but the applications are not limited to these applications.

Among them, it is effective that the magnesium secondary battery in the present disclosure is applied to battery packs, electric vehicles, power storage systems, power supply systems, electric tools, electronic devices, electrical devices, and the like. The battery pack is a power source using the magnesium secondary battery in the present disclosure, and is a so-called assembled battery or the like. The electric vehicle is a vehicle that operates (travels) using the magnesium secondary battery in the present disclosure as a driving power source, and may be applied to a car (hybrid car or the like) including a driving source other than the secondary battery. The power storage system (power supply system) is a system using the magnesium secondary battery in the present disclosure as a power storage source. For example, in a household power storage system (power supply system), since the power is stored in the magnesium secondary battery in the present disclosure, which is a power storage source, home electric appliances and the like can be used using the power. The electric tool is a tool in which a movable portion (for example, a drill or the like) moves using the magnesium secondary battery in the present disclosure as a power source for driving. The electronic device and the electrical device are devices that exhibit various functions as a power source (power supply source) for operating the magnesium secondary battery in the present disclosure.

Hereinafter, a cylindrical magnesium secondary battery and a flat laminate film type magnesium secondary battery will be described.

Figure 8:
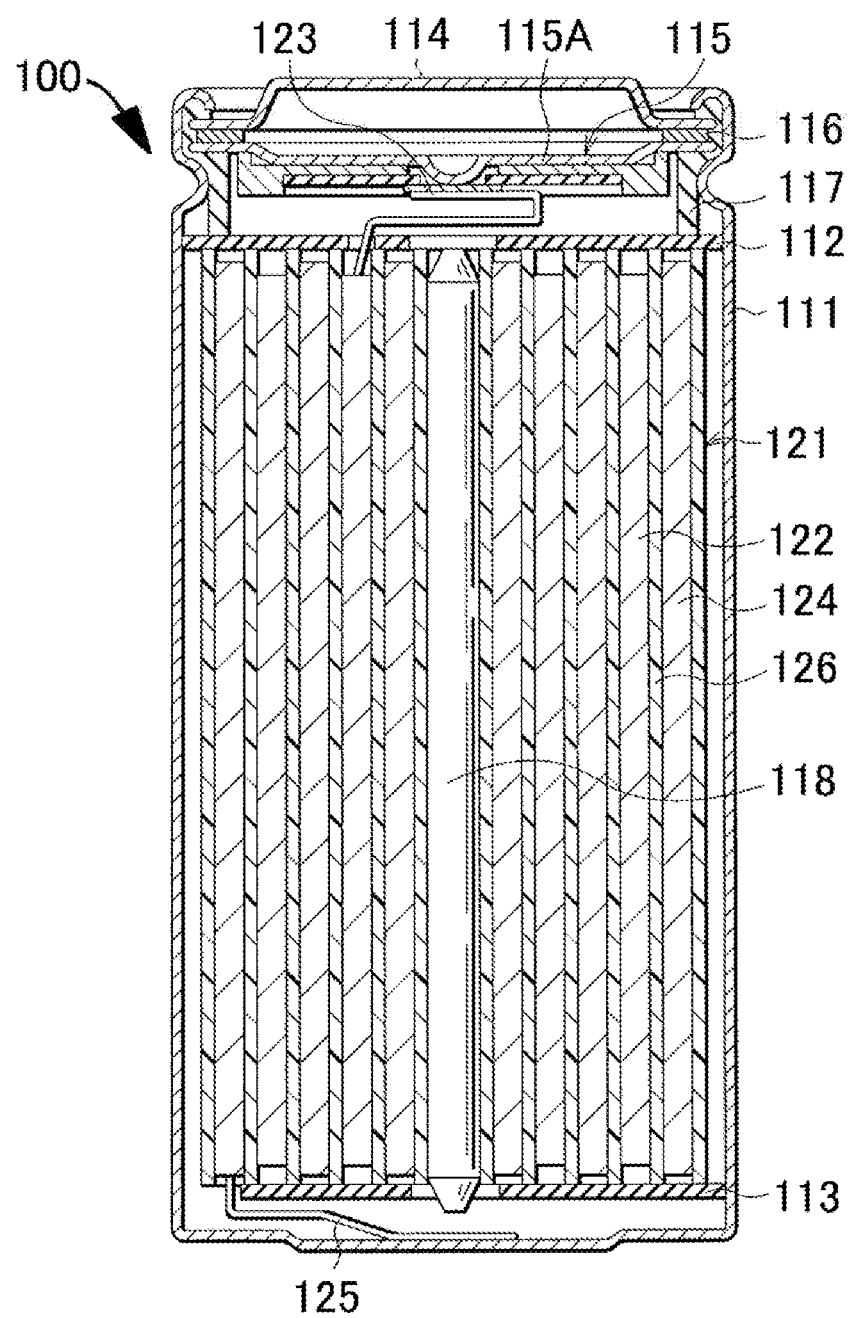
FIG. 8 is a schematic cross-sectional view of a magnesium secondary battery (cylindrical magnesium secondary battery) in Example 3.

FIG. 8 is a schematic cross-sectional view of a cylindrical magnesium secondary battery 100. In the magnesium secondary battery 100, an electrode structure 121 and a pair of insulating plates 112 and 113 are accommodated in a substantially hollow cylindrical electrode structure accommodating member 111. The electrode structure 121 can be manufactured, for example, by laminating a positive electrode 122 and a negative electrode 124 with a separator 126 interposed therebetween to obtain an electrode structure, and then winding the electrode structure. The electrode structure accommodating member (battery can) 111 has a hollow structure in which one end is closed and the other end is opened, and is made of iron (Fe), aluminum (Al), or the like. The surface of the electrode structure accommodating member 111 may be plated with nickel (Ni) or the like. The pair of insulating plates 112 and 113 sandwich the electrode structure 121 and are arranged to extend perpendicularly to the winding circumferential surface of the electrode structure 121. At the open end of the electrode structure accommodating member 111, a battery cover 114, a safety valve mechanism 115, and a thermal resistance element (a PTC element, a positive temperature coefficient element) 116 are crimped through a gasket 117, whereby the electrode structure accommodating member 111 is sealed. The battery cover 114 is made of, for example, the same material as the electrode structure accommodating member 111. The safety valve mechanism 115 and the thermal resistance element 116 are provided inside the battery cover 114, and the safety valve mechanism 115 is electrically connected to the battery cover 114 through the thermal resistance element 116. In the safety valve mechanism 115, a disc plate 115A is reversed when the internal pressure becomes equal to or higher than a predetermined value due to internal short circuit or external heating. Then, the electrical connection between the battery cover 114 and the electrode structure 121 is cut off. In order to prevent abnormal heat generation caused by a large current, the resistance of the thermal resistance element 116 increases with the temperature rise. The gasket 117 is made of, for example, an insulating material. Asphalt or the like may be applied to the surface of the gasket 117.

A center pin 118 is inserted into the winding center of the electrode structure 121. However, the center pin 118 may not be inserted into the winding center. A positive electrode lead portion 123 made of a conductive material such as aluminum is connected to the positive electrode 122. Specifically, the positive electrode lead portion 123 is attached to a positive electrode current collector. A negative electrode lead portion 125 made of a conductive material such as copper is connected to the negative electrode 124. Specifically, the negative electrode lead portion 125 is attached to a negative electrode current collector. The negative electrode lead portion 125 is welded to the electrode structure accommodating member 111 and is electrically connected to the electrode structure accommodating member 111. The positive electrode lead portion 123 is welded to the safety valve mechanism 115 and electrically connected to the battery cover 114. In the example shown in FIG. 8, the negative electrode lead portion 125 is at one place (the outermost periphery of the wound electrode structure), but may be provided at two places (the outermost periphery and the innermost periphery of the wound electrode structure).

The electrode structure 121 is formed by laminating the positive electrode 122 having a positive electrode active material layer formed on the positive electrode current collector (specifically, on both sides of the positive electrode current collector), and the negative electrode 124 having a negative electrode active material layer formed on the negative electrode current collector (specifically, on both sides of the negative electrode current collector) with the separator 126 interposed therebetween. The positive electrode active material layer is not formed in the region of the positive electrode current collector to which the positive electrode lead portion 123 is attached, and the negative electrode active material layer is not formed in the region of the negative electrode current collector to which the negative electrode lead portion 125 is attached.

The specifications of the magnesium secondary battery 100 are exemplified in Table 4 below, but are not limited thereto.

TABLE 4

| | |
|---|---|
| Positive electrode current collector | Aluminum foil of 20 μm in thickness |
| Positive electrode active material layer | 50 μm in thickness per side |
| Positive electrode lead portion | Aluminum (Al) foil of 100 μm in thickness |
| Negative current collector | Copper foil of 20 μm in thickness |
| Negative electrode active material layer | 50 μm in thickness per side |
| Negative electrode lead portion | Nickel (Ni) foil of 100 μm in thickness |

The magnesium secondary battery 100 can be produced, for example, based on the following procedure.

That is, first, positive electrode active material layers are formed on both sides of the positive electrode current collector, and negative electrode active material layers are formed on both sides of the negative electrode current collector.

Thereafter, the positive electrode lead portion 123 is attached to the positive electrode current collector using a welding method or the like. Further, the negative electrode lead portion 125 is attached to the negative electrode current collector using a welding method or the like. Next, the positive electrode 122 and the negative electrode 124 are laminated with the separator 126 made of a microporous polyethylene film of 20 μm in thickness interposed therebetween and wound (more specifically, the electrode structure (laminated structure) of positive electrode 122/separator 126/negative electrode 124/separator 126 is wound) to manufacture the electrode structure 121, and then a protective tape (not shown) is attached to the outermost periphery. Thereafter, the center pin 118 is inserted into the center of the electrode structure 121. Next, the electrode structure 121 is accommodated inside the electrode structure accommodating member (battery can) 111 while sandwiching the electrode structure 121 between the pair of insulating plates 112 and 113. In this case, the distal end of the positive electrode lead portion 123 is attached to the safety valve mechanism 115 and the distal end of the negative electrode lead portion 125 is attached to the electrode structure accommodating member 111 using a welding method or the like. Thereafter, the electrolyte solution of Example 1 is injected based on the pressure reduction method to impregnate the separator 126 with the electrolyte solution. Then, the battery cover 114, the safety valve mechanism 115, and the thermal resistance element 116 are crimped to the opening end of the electrode structure accommodating member 111 through the gasket 117.

Figure 9:
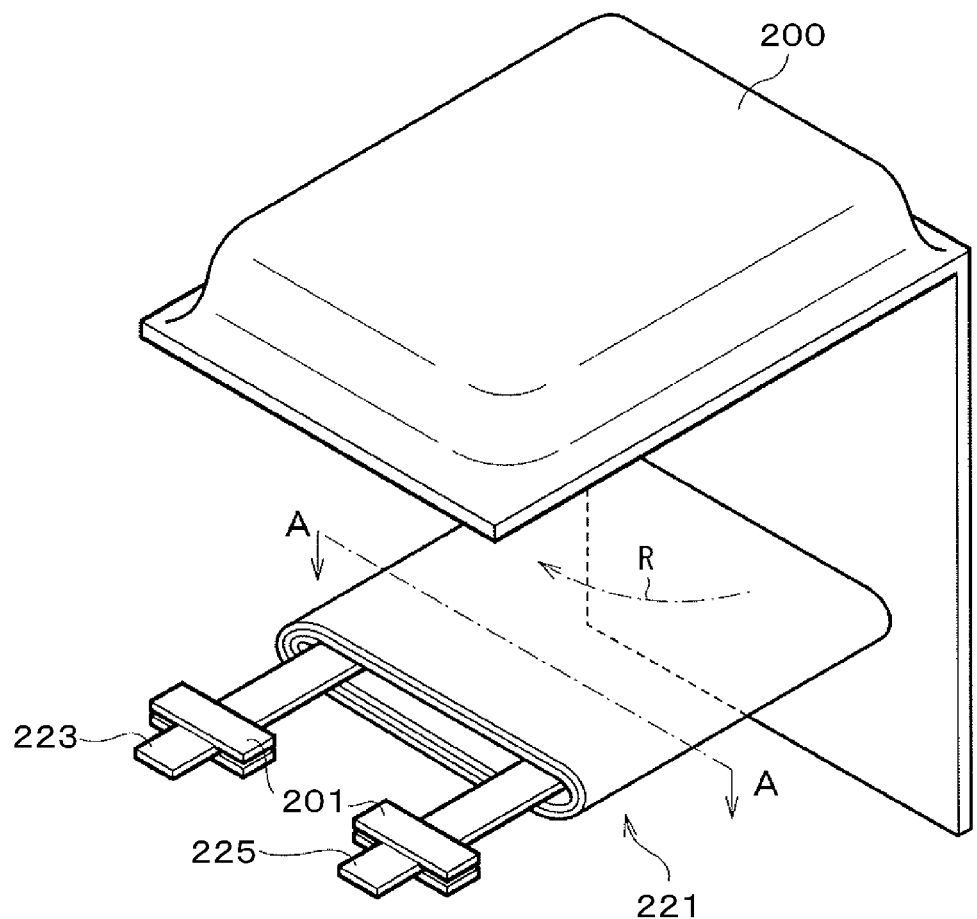
FIG. 9 is a schematic cross-sectional view of a magnesium secondary battery (flat laminate film type magnesium secondary battery) in Example 3.

Next, a flat laminate film type secondary battery will be described. FIG. 9 is a schematic exploded perspective view of the secondary battery. In the secondary battery, basically, an electrode structure 221 similar to that described above is accommodated inside an exterior member 200 made of a laminate film. The electrode structure 221 can be manufactured by laminating the positive electrode and the negative electrode with the separator interposed therebetween and the electrolyte layer and then winding the laminated structure. A positive electrode lead portion 223 is attached to the positive electrode, and a negative electrode lead portion 225 is attached to the negative electrode. The outermost periphery of the electrode structure 221 is protected by a protective tape. The positive electrode lead portion 223 and the negative electrode lead portion 225 protrude from the inside to the outside of the exterior member 200 in the same direction. The positive electrode lead portion 223 is formed of a conductive material such as aluminum. The negative electrode lead portion 225 is formed of a conductive material such as copper, nickel, stainless steel, or the like.

The exterior member 200 is a single sheet of film foldable in the direction of the arrow R shown in FIG. 9, and a recess (emboss) for accommodating the electrode structure 221 is provided in part of the exterior member 200. The exterior member 200 is, for example, a laminate film in which a fusion bonding layer, a metal layer, and a surface protective layer are laminated in this order. In the producing process of the secondary battery, after the exterior member 200 is folded so that the fusion bonding layers face each other with the electrode structure 221 interposed therebetween, the outer peripheral edges of the fusion layers are fusion-bonded. However, the exterior member 200 may be obtained by bonding two laminated films with an adhesive or the like interposed therebetween. The fusion bonding layer is made of, for example, a film of polyethylene, polypropylene, or the like. The metal layer is made of, for example, an aluminum foil or the like. The surface protective layer is made of, for example, nylon, polyethylene terephthalate, or the like. Among them, the exterior member 200 is preferably an aluminum laminate film in which a polyethylene film, an aluminum foil, and a nylon film are laminated in this order. However, the exterior member 200 may be a laminate film having another laminated structure, a polymer film such as polypropylene, or a metal film. Specifically, the exterior member 200 is formed of a moisture resistant aluminum laminate film (100 μm in total thickness) in which a nylon film (30 μm in thickness), an aluminum foil (40 μm in thickness), and a non-oriented polypropylene film (30 μm in thickness) are laminated in this order from the outside.

Close contact films 201 are inserted between the exterior member 200 and the positive electrode lead portion 223 and between the exterior member 200 and the negative electrode lead portion 225 in order to prevent the intrusion of the outside air. The close contact film 201 is made of a material having close contact property to the positive electrode lead portion 223 and the negative electrode lead portion 225, for example, polyolefin resin or the like, more specifically, polyolefin resin such as polyethylene, polypropylene, modified polyethylene, or modified polypropylene.

Next, some application examples of the magnesium secondary battery in the present disclosure will be specifically described. The configuration of each of the application examples described below is merely an example, and the configuration can be changed as appropriate.

The battery pack is a simple battery pack (a so-called soft pack) using one magnesium secondary battery in the present disclosure, and is mounted on, for example, an electronic device represented by a smartphone.

Alternatively, the battery pack includes an assembled battery including six magnesium secondary batteries in the present disclosure connected in two in parallel and three in series. The connection type of the magnesium secondary battery may be in series, in parallel, or a combination of both.

Figure 10:
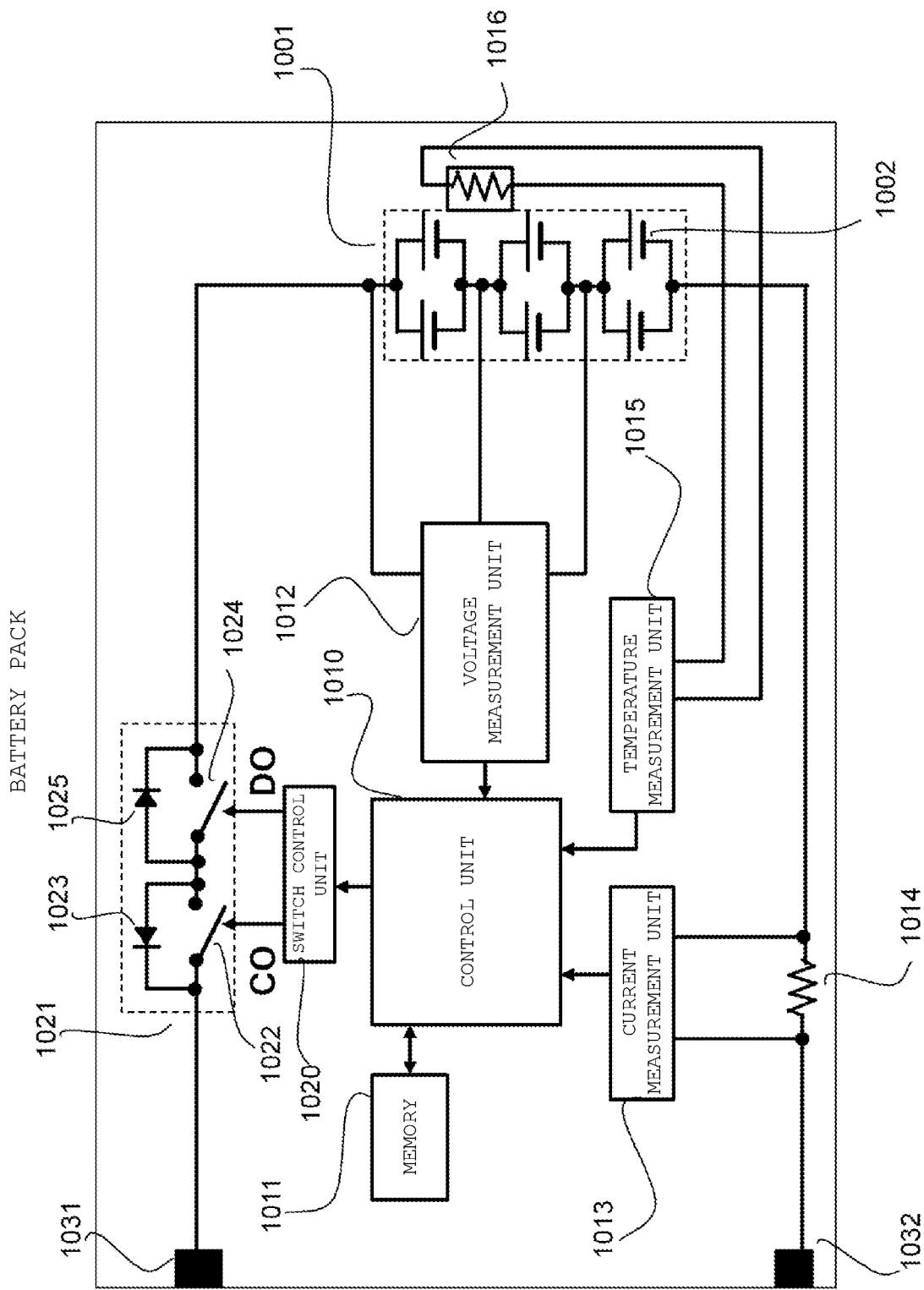
FIG. 10 is a block diagram showing an example of a circuit configuration in Example 3 in the case where the magnesium secondary battery in the present disclosure described in Example 1 is applied to a battery pack.

FIG. 10 is a block diagram showing an example of a circuit configuration in the case where the magnesium secondary battery in the present disclosure is applied to the battery pack. The battery pack includes a cell (assembled battery) 1001, an exterior member, a switch unit 1021, a current detection resistor 1014, a temperature detection element 1016, and a control unit 1010. The switch unit 1021 includes a charge control switch 1022 and a discharge control switch 1024. Further, the battery pack includes a positive electrode terminal 1031 and a negative electrode terminal 1032, and during charging, the positive electrode terminal 1031 and the negative electrode terminal 1032 are connected to the positive electrode terminal and the negative electrode terminal of a charger, respectively, to perform charging. When the electronic device is used, the positive electrode terminal 1031 and the negative electrode terminal 1032 are connected to the positive electrode terminal and the negative electrode terminal of the electronic device, respectively, to perform discharging.

The cell 1001 is configured by connecting a plurality of magnesium secondary batteries 1002 in the present disclosure in series and/or in parallel. Note that FIG. 10 shows the case where six magnesium secondary batteries 1002 are connected in two in parallel and three in series (2P3S), but in addition, any connection method may be used like p in parallel and q in series (provided that p and q are integers).

The switch unit 1021 includes the charge control switch 1022, a diode 1023, the discharge control switch 1024, and a diode 1025, and is controlled by the control unit 1010. The diode 1023 has polarity in a reverse direction to the charge current flowing from the positive electrode terminal 1031 to the cell 1001 and a forward direction to the discharge current flowing from the negative electrode terminal 1032 to the cell 1001. The diode 1025 has polarity in a forward direction to the charge current and a reverse direction to the discharge current. Although the switch unit is provided on the plus (+) side in the example, it may be provided on the minus (−) side. The charge control switch 1022 is closed when the battery voltage becomes the overcharge detection voltage, and is controlled by the control unit 1010 so that the charge current does not flow in the current path of the cell 1001. After the charge control switch 1022 is closed, only discharge can be performed through the diode 1023. In addition, the charge control switch 1022 is closed when a large current flows during charging, and is controlled by the control unit 1010 to cut off the charge current flowing in the current path of the cell 1001. The discharge control switch 1024 is closed when the battery voltage becomes the over-discharge detection voltage, and is controlled by the control unit 1010 so that the discharge current does not flow in the current path of the cell 1001. After the discharge control switch 1024 is closed, only charge can be performed through the diode 1025. In addition, the discharge control switch 1024 is closed when a large current flows during discharging, and is controlled by the control unit 1010 to cut off the discharge current flowing in the current path of the cell 1001.

The temperature detection element 1016 is, for example, a thermistor, and is provided in the vicinity of the cell 1001. A temperature measurement unit 1015 measures the temperature of the cell 1001 using the temperature detection element 1016 and sends the measurement result to the control unit 1010. A voltage measurement unit 1012 measures the voltage of the cell 1001 and the voltage of each of the magnesium secondary batteries 1002 that constitute the cell 1001, A/D converts the measurement result, and sends it to the control unit 1010. A current measurement unit 1013 measures the current using the current detection resistor 1014, and sends the measurement result to the control unit 1010.

A switch control unit 1020 controls the charge control switch 1022 and the discharge control switch 1024 of the switch unit 1021 based on the voltage and the current sent from the voltage measurement unit 1012 and the current measurement unit 1013. The switch control unit 1020 sends the control signal to the switch unit 1021 when the voltage of any of the magnesium secondary batteries 1002 becomes equal to or lower than the overcharge detection voltage or the overdischarge detection voltage or when a large current rapidly flows, to thereby prevent overcharge and overdischarge and overcurrent charge and discharge. The charge control switch 1022 and the discharge control switch 1024 can be configured by semiconductor switches such as MOSFETs, for example. In this case, the diodes 1023 and 1025 are configured by parasitic diodes of the MOSFETs. When a p-channel FET is used as the MOSFET, the switch control unit 1020 supplies a control signal DO and a control signal CO to gate portions of the charge control switch 1022 and the discharge control switch 1024. The charge control switch 1022 and the discharge control switch 1024 are brought into conduction by a gate potential which is lower than a source potential by a predetermined value or more. That is, in the normal charge and discharge operation, the control signal CO and the control signal DO are set to the low level, and the charge control switch 1022 and the discharge control switch 1024 are brought into conduction. Then, for example, in the case of overcharge or overdischarge, the control signal CO and the control signal DO are set to the high level, and the charge control switch 1022 and the discharge control switch 1024 are closed.

A memory 1011 is formed of, for example, an EPROM (Erasable Programmable Read Only Memory) which is a non-volatile memory. The memory 1011 stores in advance the numerical value calculated by the control unit 1010, the internal resistance value of the magnesium secondary battery in the initial state of each magnesium secondary battery 1002 measured at the stage of the producing process, and the like, which can be rewritten as appropriate. Further, by storing the full charge capacity of the magnesium secondary battery 1002, for example, the remaining capacity can be calculated together with the control unit 1010.

The temperature measurement unit 1015 measures the temperature using the temperature detection element 1016, performs charge/discharge control at the time of abnormal heat generation, and performs correction in calculation of the remaining capacity.

Figure 11A:
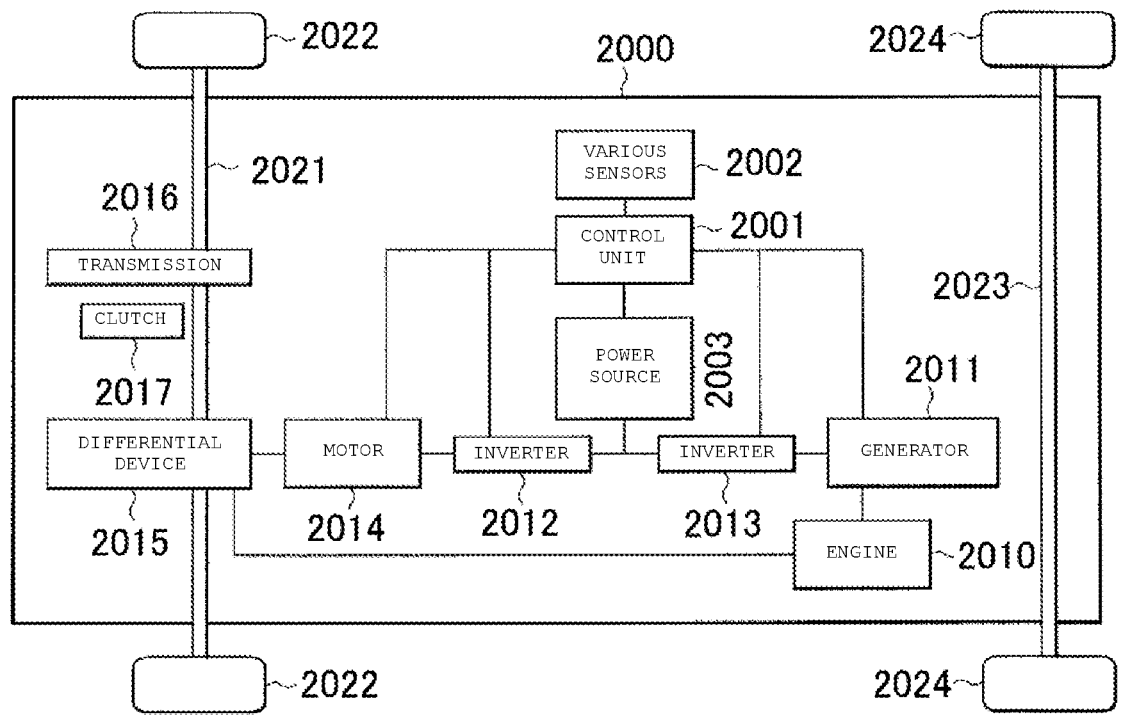
FIGS. 11A, 11B, and 11C are respectively a block diagram showing a configuration of an application example (electric vehicle) of the present disclosure in Example 3, a block diagram showing a configuration of an application example (power storage system) of the present disclosure in Example 3, and a block diagram showing a configuration of an application example (electric tool) of the present disclosure in Example 3.

Next, FIG. 11A is a block diagram showing a configuration of an electric vehicle such as a hybrid car which is an example of the electric vehicle. For example, the electric vehicle includes, for example, a control unit 2001, various sensors 2002, a power source 2003, an engine 2010, a generator 2011, inverters 2012 and 2013, a driving motor 2014, a differential device 2015, a transmission 2016, and a clutch 2017 inside a metal case 2000. In addition, the electric vehicle includes, for example, a front wheel drive shaft 2021, a front wheel 2022, a rear wheel drive shaft 2023, and a rear wheel 2024 connected to the differential device 2015 and the transmission 2016.

The electric vehicle can travel, for example, using any one of the engine 2010 and the motor 2014 as a driving source. The engine 2010 is a main power source, for example, a gasoline engine. When the engine 2010 is used as a power source, the driving force (rotational force) of the engine 2010 is transmitted to the front wheel 2022 or the rear wheel 2024 via, for example, the differential device 2015 which is a driving unit, the transmission 2016, and the clutch 2017. The rotational force of the engine 2010 is also transmitted to the generator 2011, the generator 2011 generates AC power using the rotational force, and the alternating current power is converted to DC power via the inverter 2013 and stored in the power source 2003. On the other hand, when the motor 2014 which is a conversion unit is used as a power source, the power (DC power) supplied from the power source 2003 is converted into AC power via the inverter 2012, and the motor 2014 is driven using AC power. The driving force (rotational force) converted from the power by the motor 2014 is transmitted to the front wheel 2022 or the rear wheel 2024 via, for example, the differential device 2015 which is a driving unit, the transmission 2016, and the clutch 2017.

When the electric vehicle decelerates via a braking mechanism (not shown), the resistance during deceleration is transmitted to the motor 2014 as a rotational force, and the rotational force may be used to cause the motor 2014 to generate AC power. The AC power is converted to DC power via the inverter 2012, and DC regenerative power is stored in the power source 2003.

The control unit 2001 controls the operation of the entire electric vehicle, and includes, for example, a CPU. The power source 2003 includes one or more magnesium secondary batteries (not shown) described in Example 1. The power source 2003 may be connected to an external power source, and may be configured to store power by receiving power supply from the external power source. The various sensors 2002 are used, for example, to control the rotational speed of the engine 2010 and to control the opening degree (throttle opening degree) of a throttle valve (not shown). The various sensors 2002 include, for example, a speed sensor, an acceleration sensor, an engine rotational speed sensor, and the like.

Although the case where the electric vehicle is a hybrid car has been described, the electric vehicle may be a vehicle (electric car) that operates only using the power source 2003 and the motor 2014 without using the engine 2010.

Figure 11B:
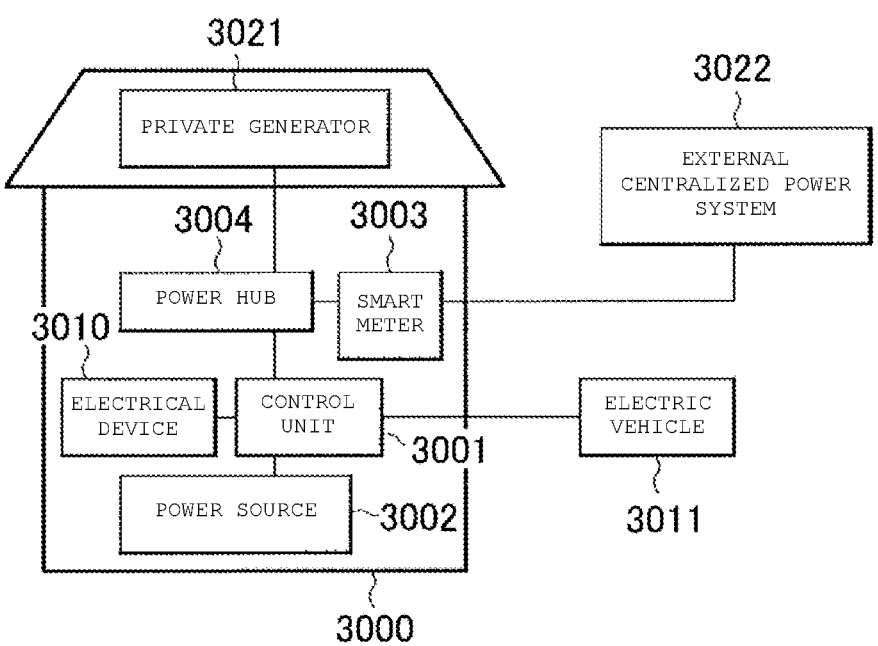

Next, FIG. 11B is a block diagram showing a configuration of the power storage system (power supply system). The power storage system includes, for example, a control unit 3001, a power source 3002, a smart meter 3003, and a power hub 3004 inside a house 3000 such as a home or a commercial building.

The power source 3002 is connected to, for example, an electrical device (electronic device) 3010 installed inside the house 3000, and can be connected to an electric vehicle 3011 stopped outside the house 3000. Further, the power source 3002 is connected to, for example, a private generator 3021 installed in the house 3000 via the power hub 3004, and can be connected to an external centralized power system 3022 via the smart meter 3003 and a power hub 3004. The electrical device (electronic device) 3010 includes, for example, one or more home appliances. As the household appliances, there can be given, for example, refrigerators, air-conditioners, television receivers, and water heaters. The private generator 3021 is configured of, for example, a solar power generator, a wind power generator, or the like. As the electric vehicle 3011, there can be given, for example, electric cars, hybrid cars, electric motorcycles, electric bicycles, and Segway (registered trademark). As the centralized power system 3022, there can be given commercial power sources, power generation devices, power transmission networks, and smart grids (next generation power transmission networks), and further, there can be given, for example, thermal power plants, nuclear power plants, hydro-electric power plants, wind power plants. In addition, as the power generation device included in the centralized power system 3022, there are given various solar cells, fuel cells, wind power generators, micro-hydro power generators, and geothermal power generators. The present disclosure is not limited thereto.

The control unit 3001 controls the operation of the entire power storage system (including the use state of the power source 3002), and includes, for example, a CPU. The power source 3002 includes one or more magnesium secondary batteries (not shown) described in Example 1. The smart meter 3003 is, for example, a network compatible power meter installed in the house 3000 on the power demand side, and can communicate with the power supply side. The smart meter 3003 can perform efficient and stable energy supply by controlling the balance of supply and demand in the house 3000 while communicating with the outside, for example.

In the power storage system, for example, power is stored in the power source 3002 from the centralized power system 3022 which is an external power source via the smart meter 3003 and the power hub 3004, and power is stored in the power source 3002 from the private generator 3021 which is an independent power source via the power hub 3004. The power stored in the power source 3002 is supplied to the electrical device (electronic device) 3010 and the electric vehicle 3011 in accordance with the instruction of the control unit 3001, so that the electrical device (electronic device) 3010 can be operated and the electric vehicle 3011 can be charged. That is, the power storage system is a system that enables storage and supply of the power in the house 3000 using the power source 3002.

The power stored in the power source 3002 is optionally available. Therefore, for example, power can be stored in the power source 3002 from the centralized power system 3022 at midnight at which the electricity charge is inexpensive, and the power stored in the power source 3002 can be used during the day when the electricity charge is high.

The power storage system described above may be installed for each household (one family unit), or may be installed for a plurality of households (a plurality of family units).

Figure 11C:
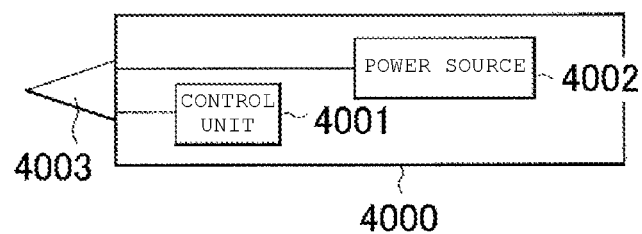

Next, FIG. 11C is a block diagram showing a configuration of the electric tool. The electric tool is, for example, a power drill, and includes a control unit 4001 and a power source 4002 inside a tool main body 4000 made of a plastic material or the like. For example, a drill portion 4003 which is a movable portion is rotatably attached to the tool main body 4000. The control unit 4001 controls the operation of the entire electric tool (including the use state of the power source 4002), and includes, for example, a CPU. The power source 4002 includes one or more magnesium secondary batteries (not shown) described in Example 1. The control unit 4001 supplies power from the power source 4002 to the drill portion 4003 in accordance with the operation of an operation switch (not shown).

Although the present disclosure has been described above based on the preferred Examples, the present disclosure is not limited to these Examples. The composition of the electrolyte solution described in the Examples, the raw materials used for the production, the production method, the production conditions, the characteristics of the electrolyte solution, and the configuration and the structure of the electrochemical device or the battery are exemplifications, the present disclosure is not limited thereto, and changes may be made as appropriate. The electrolyte solution of the present disclosure may be mixed with an organic polymer (for example, polyethylene oxide, polyacrylonitrile, polyvinylidene fluoride (PVdF)) and used as a gel electrolyte.

The present disclosure can also be configured as follows.

[A01] "Electrolyte Solution"

An electrolyte solution for an electrochemical device including a negative electrode made of a magnesium-based material, in which the electrolyte solution consists of a solvent composed of linear ether, and magnesium salt dissolved in the solvent, and in which the magnesium salt is dissolved in 3 moles or more per liter of the solvent.

[A02] The electrolyte solution for an electrochemical device according to the item [A01], in which the electrochemical device further includes a positive electrode, and in which solubility of sulfur is 0.5 milligram or less per milliliter of the electrolyte solution.

[A03] The electrolyte solution according to the item [A01] or [A02], in which the magnesium salt is $MgCl_2$ and $Mg(TFSI)_2$.

[A04] The electrolyte solution according to any one of the items [A01] to [A03], in which the solvent is dimethoxyethane.

[B01] "Electrochemical Device"

An electrochemical device including a negative electrode made of a magnesium-based material, in which the electrochemical device includes an electrolyte solution consisting of a solvent composed of linear ether, and magnesium salt dissolved in the solvent, and in which the magnesium salt is dissolved in 3 moles or more per liter of the solvent.

[B02] The electrochemical device according to the item [B01] further including a positive electrode made of sulfur, in which solubility of sulfur is 0.5 milligram or less per milliliter of the electrolyte solution.

[B03] The electrochemical device according to the item [B01] or [B02], in which the magnesium salt is $MgCl_2$ and $Mg(TFSI)_2$.

[B04] The electrochemical device according to any one of the items [B01] to [B03], in which the solvent is dimethoxyethane.

[B05] The electrochemical device according to any one of the items [B01] to [B04], which is a battery in which an electrolyte layer is constituted by an electrolyte solution.

[B06] The electrochemical device according to any one of the items [B01] to [B05], including a negative electrode composed of magnesium, a magnesium alloy, or a magnesium compound.

[C01] "Battery Pack"

A battery pack including a secondary battery, control means that performs control related to the secondary battery, and an outer package accommodating the secondary battery, in which the secondary battery is formed of the electrochemical device according to any one of the items [B01] to [B06].

[C02] "Electronic Device"

An electronic device that receives power supply from a secondary battery, in which the secondary battery is formed of the electrochemical device according to any one of the items [B01] to [B06].

[C03] "Electric Vehicle"

An electric vehicle including:

a conversion device which receives power supply from the secondary battery and converts the power into a driving force of a vehicle; and a control device that performs information processing related to vehicle control based on information related to the secondary battery in which the secondary battery is formed of the electrochemical device according to any one of the items [B01] to [B06].

[C04] "Power System"

A power system configured to receive power supply from a secondary battery and/or supply power from a power source to the secondary battery, in which the secondary battery is formed of the electrochemical device according to any one of the items [B01] to [B06].

[C05] "Power source for storing power"

A power source for storing power including a secondary battery and configured to be connected to an electronic device to which power is supplied, in which the secondary battery is formed of the electrochemical device according to any one of the items [B01] to [B06].

DESCRIPTION OF REFERENCE SYMBOLS

10: positive electrode
11: negative electrode
12: electrolyte layer
20: coin battery
21: coin battery can
22: gasket
23: positive electrode
24: separator
25: negative electrode
26: spacer
27: coin battery cover
31: positive electrode
32: negative electrode
33: separator
35, 36: current collector
37: gasket
41: porous positive electrode
42: negative electrode
43: separator and electrolyte solution
44: air electrode side current collector
45: negative electrode side current collector
46: diffusion layer
47: oxygen-selective permeable film
48: exterior body
51: air (atmosphere)
52: oxygen
61: positive electrode
62: positive electrode electrolyte solution
63: positive electrode electrolyte solution transport pump
64: fuel flow path
65: positive electrode electrolyte solution storage container
71: negative electrode
72: negative electrode electrolyte solution
73: negative electrode electrolyte solution transport pump
74: fuel flow path
75: negative electrode electrolyte solution storage container
66: ion exchange membrane
100: magnesium secondary battery
111: electrode structure accommodating member (battery can)
112, 113: insulating plate
114: battery cover
115: safety valve mechanism
115A: disc plate
116: thermal resistance element (PTC element)
117: gasket
118: center pin
121: electrode structure
122: positive electrode
123: positive electrode lead portion
124: negative electrode
125: negative electrode lead portion
126: separator
200: exterior member
201: close contact film
221: electrode structure
223: positive electrode lead portion
225: negative electrode lead portion
1001: cell (assembled battery)
1002: magnesium secondary battery
1010: control unit
1011: memory
1012: voltage measurement unit
1013: current measurement unit
1014: current detection resistor
1015: temperature measurement unit
1016: temperature detection element
1020: switch control unit
1021: switch unit
1022: charge control switch
1024: discharge control switch
1023, 1025: diode
1031: positive terminal
1032: negative terminal
CO, DO: control signal
2000: case
2001: control unit
2002: various sensors
2003: power source
2010: engine
2011: generator
2012, 2013: inverter
2014: driving motor
2015: differential device
2016: transmission
2017: clutch
2021: front wheel drive shaft
2022: front wheel
2023: rear wheel drive shaft
2024: rear wheel
3000: house
3001: control unit
3002: power source
3003: smart meter
3004: power hub
3010: electrical device (electronic device)
3011: electric vehicle
3021: private generator 3022: centralized power system
4000: tool main body
4001: control unit
4002: power source
4003: drill portion

The invention claimed is:

1. An electrochemical device comprising a negative electrode including a magnesium-based material, and a positive electrode including $S_8$ or polymeric sulfur,
   wherein the electrochemical device includes an electrolyte solution consisting of a solvent composed of linear ether, and magnesium salt dissolved in the solvent,
   wherein a total concentration of the magnesium salt in the electrolyte solution is in a high concentration state such that the magnesium salt is dissolved in 3 moles or more per liter of the solvent, thereby the solvent in the electrolyte solution is in a state of being substantially coordinated to the magnesium salt and not substantially coordinated to the $S_8$ or polymeric sulfur, and
   wherein solubility of $S_8$ or polymeric sulfur is 0.5 milligram or less per milliliter of the electrolyte solution.

2. The electrochemical device according to claim 1, wherein the magnesium salt is $MgCl_2$ and $Mg(TFSI)_2$.

3. The electrochemical device according to claim 1, wherein the solvent is dimethoxyethane.

* * * * *